(12) United States Patent
Gramazio et al.

(10) Patent No.: US 9,840,053 B2
(45) Date of Patent: Dec. 12, 2017

(54) APPARATUS AND METHOD FOR VERTICAL SLIP FORMING OF CONCRETE STRUCTURES

(71) Applicant: ETH ZURICH, Zurich (CH)

(72) Inventors: Fabio Gramazio, Zürich (CH); Matthias Kohler, Riedikon (CH); Robert Flatt, Meilen (CH); Ena Lloret Kristensen, Zürich (CH)

(73) Assignee: ETH ZURICH, Zurich (CH)

( * ) Notice: Subject to any disclaimer, the term of this patent is extended or adjusted under 35 U.S.C. 154(b) by 78 days.

(21) Appl. No.: 14/766,550

(22) PCT Filed: Feb. 4, 2014

(86) PCT No.: PCT/EP2014/000281
§ 371 (c)(1),
(2) Date: Aug. 7, 2015

(87) PCT Pub. No.: WO2014/121917
PCT Pub. Date: Aug. 14, 2014

(65) Prior Publication Data
US 2015/0367588 A1 Dec. 24, 2015

(30) Foreign Application Priority Data
Feb. 8, 2013 (EP) .................................... 13154652

(51) Int. Cl.
*E04G 11/22* (2006.01)
*B29D 99/00* (2010.01)
(Continued)

(52) U.S. Cl.
CPC .............. *B29D 99/001* (2013.01); *B28B 3/20* (2013.01); *B28B 17/0081* (2013.01);
(Continued)

(58) Field of Classification Search
CPC ........... B29D 99/001; E04B 2/84; E04B 1/16; E04G 11/22; E04G 2021/049; B28B 17/0081; B28B 3/20; B29C 39/44
(Continued)

(56) References Cited

U.S. PATENT DOCUMENTS

| 3,325,146 A | 6/1967 | Ahl | |
| 4,253,810 A * | 3/1981 | Bezhanov | ............... E04G 11/22 249/20 |

(Continued)

FOREIGN PATENT DOCUMENTS

| GB | 1175358 A | 12/1969 | |
| GB | 2267110 A * | 11/1993 | ................ B25J 9/02 |

(Continued)

OTHER PUBLICATIONS

International Search Report of PCT/EP2014/000281 dated May 15, 2014 [PCT/ISA/210].
(Continued)

*Primary Examiner* — Robert B Davis
(74) *Attorney, Agent, or Firm* — Sughrue Mion, PLLC

(57) ABSTRACT

Apparatus (10) for vertical (72) slip forming of concrete walls and columns (55). The apparatus comprises an attachment portion (23) for a frame with a slipform assembly inside comprising an extrusion form providing side walls defining a cavity and actuators (20) to adjust the position of the side walls forms essentially arranged along the longitudinal axis of the slipform assembly. A concrete supply (45) is connected with the slipform assembly for delivering concrete (52, 53, 54) to that cavity through the top open surface. A mechanism (20) is provided for vertically displacing (72) that slipform assembly incrementally relative to the frame. Thus, a concrete structure (55) having a vertical orientation is continuously cast. The actuators (20) adjust the (Continued)

position of the side walls during the incremental vertical movement (72) of the slipform assembly to create new forms for a column or wall with variable diameter, variable form and/or twisted.

10 Claims, 6 Drawing Sheets

(51) Int. Cl.
    *B28B 3/20*     (2006.01)
    *B28B 17/00*     (2006.01)
    *B29C 39/44*     (2006.01)
    *E04B 1/16*     (2006.01)
    *E04B 2/84*     (2006.01)
    *E04G 21/04*     (2006.01)

(52) U.S. Cl.
    CPC ............... *B29C 39/44* (2013.01); *E04B 1/16* (2013.01); *E04B 2/84* (2013.01); *E04G 11/22* (2013.01); *E04G 2021/049* (2013.01)

(58) Field of Classification Search
    USPC .................................................... 425/63, 64
    See application file for complete search history.

(56) References Cited

U.S. PATENT DOCUMENTS

| | | | |
|---|---|---|---|
| 4,374,790 A * | 2/1983 | McGowan | E04G 21/0427 |
| | | | 264/310 |
| 4,540,150 A | 9/1985 | Tzincoca | |
| 5,198,235 A | 3/1993 | Reichstein et al. | |
| 7,004,737 B2 * | 2/2006 | Russell | E04B 1/3404 |
| | | | 249/20 |
| 2003/0033772 A1 | 2/2003 | Russell | |
| 2003/0034576 A1 | 2/2003 | Russell | |

FOREIGN PATENT DOCUMENTS

| | | | | |
|---|---|---|---|---|
| WO | 2004/065707 A2 | 8/2004 | | |
| WO | WO 2013064826 A1 * | 5/2013 | ............... | B28B 3/20 |

OTHER PUBLICATIONS

Written Opinion of PCT/EP2014/000281 dated May 15, 2014 [PCT/ISA/237].

* cited by examiner

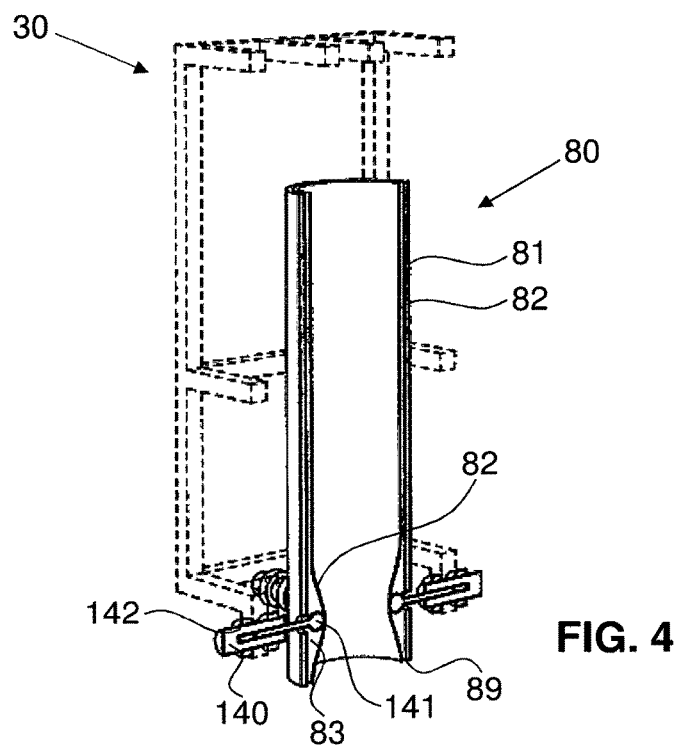
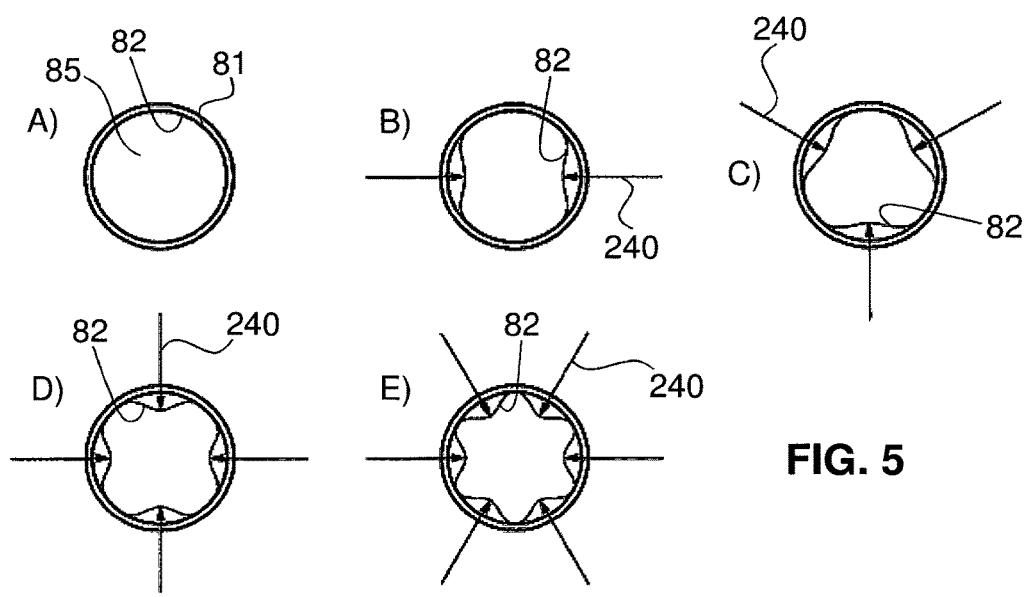
FIG. 4
FIG. 5

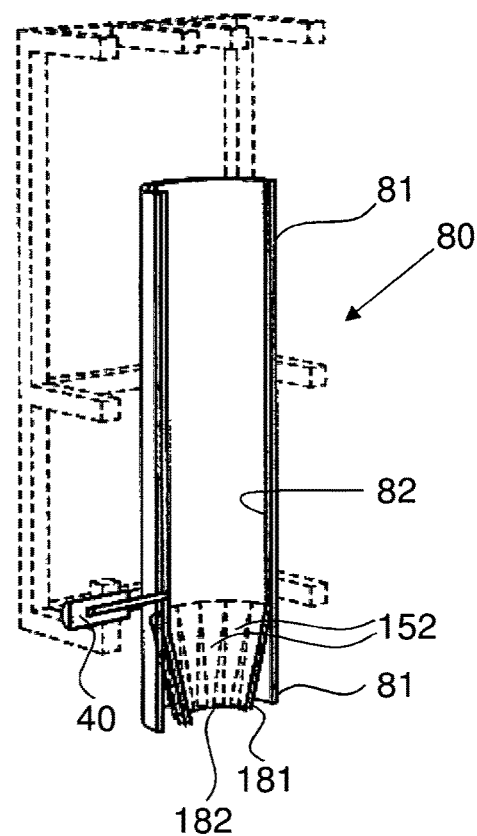
FIG. 6
FIG. 7
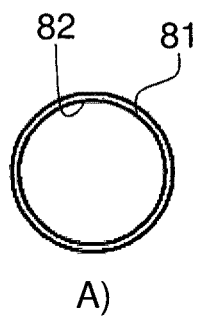 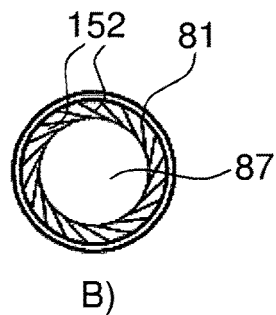 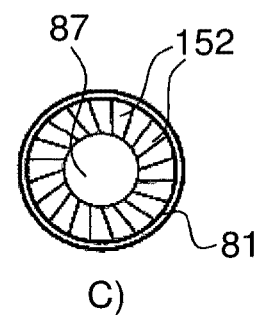
A)          B)          C)

APPARATUS AND METHOD FOR VERTICAL SLIP FORMING OF CONCRETE STRUCTURES

CROSS REFERENCE TO RELATED APPLICATIONS

This application is a National Stage of International Application No. PCT/EP2014/000281, filed Feb. 4, 2014, claiming priority based on European Patent Application No. 13154652.5, filed Feb. 8, 2013, the contents of all of which are incorporated herein by reference in their entirety.

TECHNICAL FIELD

The present invention relates to an apparatus for vertical slip forming of concrete structures, especially walls or columns, comprising an attachment portion for a frame; a slipform assembly connected with the attachment means, wherein the slipform assembly comprises an extrusion form providing side walls defining a cavity with a top open surface and a bottom open surface and actuators adapted to adjust the position of the side walls forms essentially arranged along the longitudinal axis of the slipform assembly; concrete supply means connected with the slipform assembly for delivering concrete to that cavity through the top open surface; and means for vertically displacing that slipform assembly incrementally relative to the frame thereby to continuously cast a concrete structure having a vertical orientation, as well as a method for vertical slip forming of concrete walls.

PRIOR ART

Slipforming, a dynamic casting process, was invented already in 1899 by Charles Haglin. It is a single-step process, in which concrete is continuously poured into a delaminated formwork that moves vertically in a speed set according to the rate of the hydration of the concrete, so that the material is self-supporting when it leaves the cast. One of the first structures erected with this technique was an initially 21-meter-high reinforced concrete grain elevator, for which the slipforming was driven by hand. National, U. S. D. o. t. I. H. C. a. R. S., 78. Peavey-Haglin Experimental Concrete Grain Elevator. Available at: http://pdfhost.focus.nps.gov/docs/NHLS/Text/78001547.pdf [Accessed Dec. 11, 2012].

In the course of the 20th century, architectural construction has gone through intense innovation in its material, engineering and design, radically transforming the way buildings were and are conceived. Technological advances enabled and challenged architects, engineers and constructors to build increasingly complex architectural structures from concrete. Computer-aided design and manufacturing (CAD/CAM) techniques have, more recently, rejuvenated and increased the possibilities of realizing ever more complex geometries. Reinforced concrete is often chosen for such structures since almost any shape can be achieve when poured into a formwork. However, designs generated with digital tools tend to have limited relation to the efficient modes of production typically used in concrete construction of today; as a large gap has emerged between the technology in architectural design and the building industry, so that no efficient solutions exist for the production of geometrically complex structures in concrete.

An apparatus with the features of the preamble of claim 1 is known from U.S. Pat. No. 5,198,235. There an apparatus for vertical slip forming of concrete walls is disclosed comprising an attachment portion for a frame; a slipform assembly connected with the attachment means wherein the slipform assembly comprises according to the prior art a pair of spaced adjustable vertical forms having opposed planar surfaces as well as closing plate elements to provide and defining a cavity. Furthermore this apparatus comprises concrete supply means connected with the slipform assembly for delivering concrete to that cavity; and means for vertically displacing that slipform assembly incrementally relative to the frame thereby to continuously cast a concrete structure having a vertical orientation. The term frame is used in this context as the connection with the environment, e.g. with the ground or a scaffold. It can also be named the base.

It is already an option with this prior art to move the apparatus around the site for the construction of various walls and at that occasion a different thickness of the walls can be chosen through an adjustment mechanism. Then the apparatus is mounted with different scaffolds or portions of a scaffold on the site. The form of the cavity is a predetermined rectangular cavity (in cross-section).

US 2003/0034576 relates to slip-forming and jump-forming to form a curved wall, wherein specific cast structures are provided to achieve this goal, including a fixed tapered form, i.e. a tapered form which is not changed in use. US 2003/033772, from the same inventor as the previously mentioned prior art document, uses a similar approach.

U.S. Pat. No. 4,540,150 explains how brackets and walls are to be moved to be extended over several meters of height; but no direct forming of an element is shown.

WO 2004/065707 provides another assembly for subsequent pouring of material to provide more complex structures than a single wall.

U.S. Pat. No. 3,325,146 does also show a raising mechanism without having additional features over the other documents cited above.

SUMMARY OF THE INVENTION

Based on this prior art it is therefore an object of the present invention to provide an improved solution of casting techniques both with static and dynamic formwork which, when combined with digital fabrication, allow innovative fabrication of concrete structures, especially walls and columns.

This and further goals are achieved with the characterizing features of the independent claim, i.e. that the actuators are adapted to adjust the position of the side walls during the incremental vertical movement of the slipform assembly.

The underlying process involves the synchronization of: a.) Choosing the predetermined concrete material for its setting and hardening rates, b.) Setting the feeding rate of the fresh material (this is weight that must largely be carried by the released material); and c.) providing control signals to the actuators to determine the shaping and release rate of the material by the apparatus.

The feeding may be done by discrete batches or continuously.

The synchronization can especially achieved through two different approaches, either:
1. Predictive capacity of the material properties evolution.
2. Continuous measurement of material properties either inline or offline (sample set aside and measured separately)

The inline measurement at the nozzle provides information on the shaping stage but not on the self-supporting capacity developed after as such. It is therefore preferred to anticipate this either a.) by extrapolation or by predictive models or b.) by offline measurements on samples set aside. One advantage of the measurement relates to the fact that force sensors are integrated in the formability pistons.

The control of the setting and hardening rates may be done through chemical (catalysis, polymerization, precipitation, etc.) and/or physical processes (phase change, cooling, etc.). Temperature driven processes will generally loose in efficiency as the section is increased and are therefore possible but the other approaches are preferred.

The material may be prepared continuously or by increments. In the continuous case, chemical triggers are added at a fixed dosage. A slightly different approach would be to try and really enhance the strength development at the bottom to insure enough load bearing capacity once the column reached full height. For increments a large batch is prepared of which small volume are taken and triggered successively. This has an advantage from the logistics point of view. In that case, the materials of which the main batch will evolve with time necessitate the variation of dosage of chemical triggers from batch to batch, especially a reduction. Otherwise the material could increasingly loose in shaping capacity as the column height increases. An additional possibility consists in preparing multiple batches at adequate time intervals for subsequent use. Their composition can be slightly adapted. Of course it is also possible that more than three batches are used.

If the prediction of material property evolution is chosen inline and offline measurements will drive the process. Among the offline measurements, the possibility to conduct measurements at different temperatures presents a particular advantage for chemically driven processes. Indeed it gives a possibility to accelerate the stiffening and hardening of each batch and to back extrapolate the critical time windows at the production temperature. The best is probably to have at least three temperatures. Measurements could include for example: calorimetry, penetration resistance, conductimetry, rheometry (in adequate modes as for example oscillation, creep and recovery, etc.), penetration resistance and ultrasound spectrometry, inter alia. These measurements are in different areas, calorimetry is related to temperature and penetration resistance is related to force.

Although not shown in the drawings within preferred embodiments, flexible reinforcements can be introduced into the concrete. Such flexible reinforcements can be small reinforcement meshes, segments, etc. which are added throughout the process of slipforming. For example, a circle with bars welded to it, can be introduced into the apparatus together with the poured concrete, so that it is positioned at the intended position. It is also possible to provide this structure in advance and build the slipforming apparatus around such a mesh. In such cases, the size of the slip form will have to be chosen to be compatible with the targeted shape, in particular its curvatures and cross sections.

Furthermore in an alternative embodiment, in the fresh state, various forms of external reinforcement may be applied to the shaped objects by pressing onto the still soft surface. Such external reinforcement can include metallic, carbon fiber, glass fiber or textile fiber meshes or bands. Additionally, it is possible to include posttensioning cables. They could be placed from the start and possible guides for controlling their radial position in curved structures, or in ones with varying cross-section could be included. These could for example take the form of pierced metal, ceramic or polymeric plates.

It is an advantage that reusable formwork elements are used, or in other words, the workload, which is necessary to provide the formwork for subsequent structures, is reduced relating to prior art. Furthermore, the concrete structures, which are intended to be fabricated, are far more flexible than according to prior art procedure; they can be "bent", change the diameter of a column, provided as an offset to the original position of the basis, changing the diameter of the concrete wall of a hollow column.

The column can be curved with a constant diameter providing a cylindrical cast with an offset. However, it would also be possible to provide a sectional wall as in the prior art documents with the difference that the walls can be moved in a direction perpendicular to the slipform extraction process.

In this respect it would be possible that e.g. opposing actuators are moved in the same direction, so that a side movement is achieved as mentioned before.

Finally, if the cross-section of the shape is not a circle, a rotation of the slipform while moving upwards provides completely new twisted forms.

In fact, the actuators are adapted to by receive control signals from a control unit to adjust the position of the side walls during the incremental vertical movement of the slipform assembly to allow creation of new forms for such a column or wall with variable diameter, variable form and/or twisted as shown.

Further embodiments of the invention are laid down in the dependent claims.

The invention comprises a plurality of ways that the slipform assembly can be displaced, the description of the embodiments uses identical wordings as e.g. frame for different features relating to the invention. This is due to the fact that the apparatus comprises actuators for adapting the position of the side walls delimiting the flow of the concrete relative to the environment which is mentioned inter alia as frame and defined in the claims as base. The base is understood as the part of the system standing on the ground or the already erected building structures If there is no robot moving the frame, then frame and base relate to the same fix environment. In the following, different embodiments of the slipform assembly of the invention are clarified:

In one embodiment, the mould wall comprises side walls that are designed as a single piece and are not being deformed. Here the entire unit of side walls is displaced, e.g. by a robotic arm, which then is part of the frame. Such a displacement can be done laterally.

The frame can here also being rotatably mounted on a robot enabling the translation in any direction and the rotation around any axle in space. The combination of the slipform assembly together with the robot allows a variety of combination in order to achieve the desired cast structure.

In another embodiment, the mould walls are also designed as a single piece, but they are being deformed by the actuators mounted on the frame and acting on the mould walls or parts of them.

In this connection an embodiment of the mould walls comprise side walls and flexible foils, the flexible foils being deformed by the actuators, while the side walls are not being deformed.

The cast structure starts form a base and extend essentially vertically upwards from the base. There are various shapes that can be cast with the casting apparatus according to the invention.

A cast structure that includes a translation with a horizontal component of the cast square section with respect to the starting point on the base can be achieved in many ways. For producing cast structures with little horizontal deviation, a vertical movement is carried out only with the robot and the position of the mould walls is adjusted with the actuators mounted on the frame. For bigger horizontal deviations, the robot can carry out a horizontal movement as well or alone and is thereby adjusting the position of the mould walls.

A screw-like cast structure can be obtained in many ways as well. One way is to provide a vertical movement of the slipform assembly with the robot and to deform the mould walls with the actuators mounted on the frame as such that the actuators produce a time-dependent deformation on the circumference. The superimposing of the movement of the robot and the movement of the mould walls result in the desired screw-like structure.

Another option is to use a rigid mould having the desired square section and carrying out a rotary movement simultaneously with the translatory movement with the robot.

A rigid core, resulting in a constant channel within the finished cast structure, can be introduced in the mould. The shape and size can be varied, but not during the casting process.

Additionally, in the above-described embodiments a change of the cast square section can be overlaid, e.g. by using an aperture at the lower end of the slipform assembly. Such an aperture can be deformed during the casting process and as such also vary the diameter and/or form of the exiting concrete.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 4 shows a schematic drawing of a further embodiment of slipform and framework according to the invention with actuators;

FIG. 5A to 5E show different embodiments of flexible formwork geometries as a section view at the plane of the actuators through the slipform according to FIG. 4;

FIG. 6 shows a schematic drawing of a further embodiment of slipform and framework according to the invention with actuators providing a shutter system;

FIG. 7A to 7C show different embodiments of flexible formwork geometries as a section view at the plane of the shutter system according to FIG. 6;

DESCRIPTION OF PREFERRED EMBODIMENTS

Figure 1:
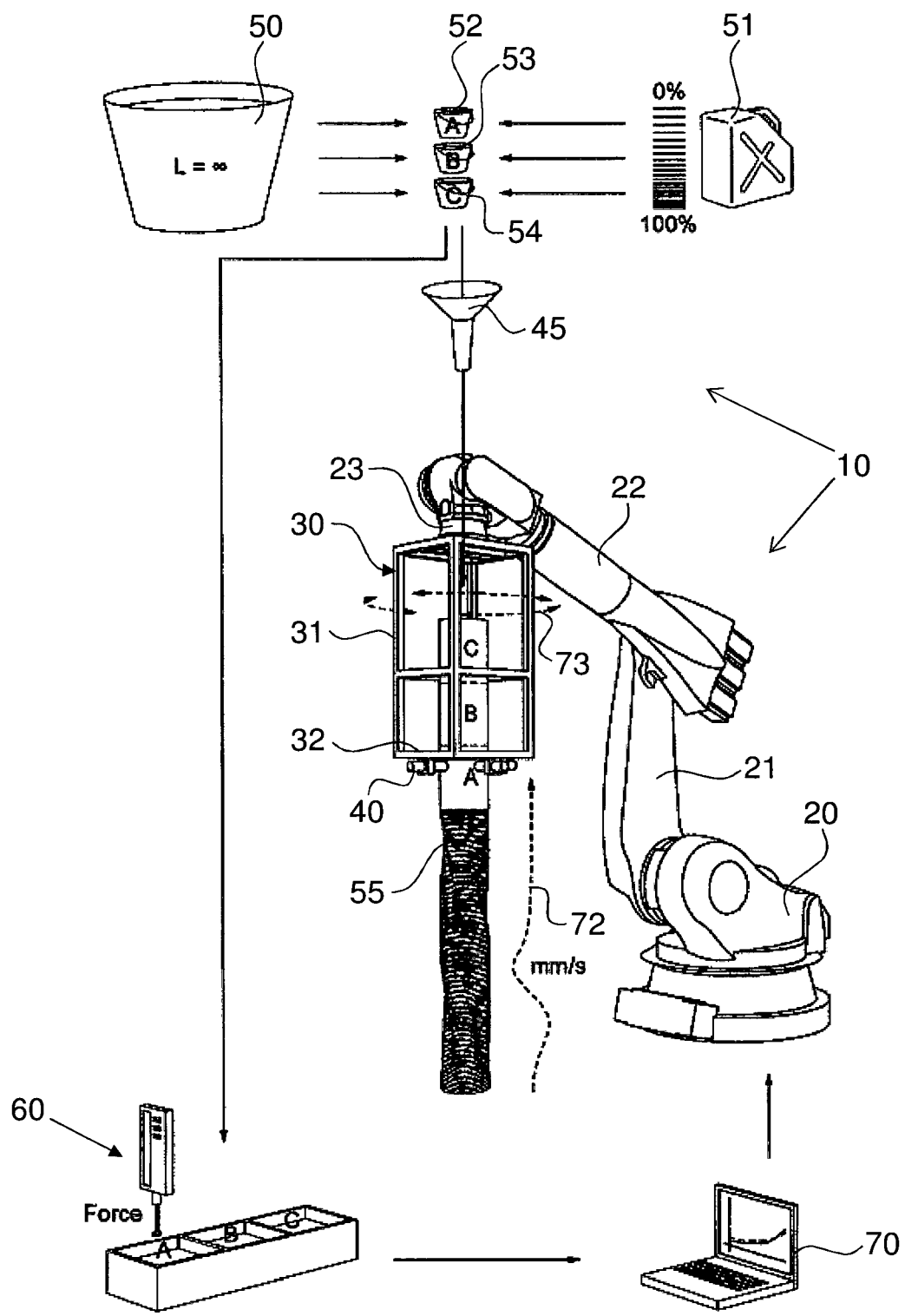
FIG. 1 shows a schematic overview of the overall setup of a slipforming apparatus according to an embodiment of the invention.

FIG. 1 shows a schematic overview of the overall setup of a slipforming apparatus 10 according to an embodiment of the invention. The apparatus 10 is intended to provide a vertical 72 movement of a mould for vertical slip forming of concrete columns 55. In FIG. 1 an essentially round column is shown, having an outer structure being rotated during the casting process as will be explained later on. The term concrete structure is used to name different possibilities in the application of the invention. Beside a column as shown in some figures, it is possible to cast walls, curved elements and hollow columns. The specific form of the concrete structure depends on the formwork used and the position of the formwork relative to the ground or relative to a fixed frame/scaffold when it is moved within the casting process.

Figure 8:
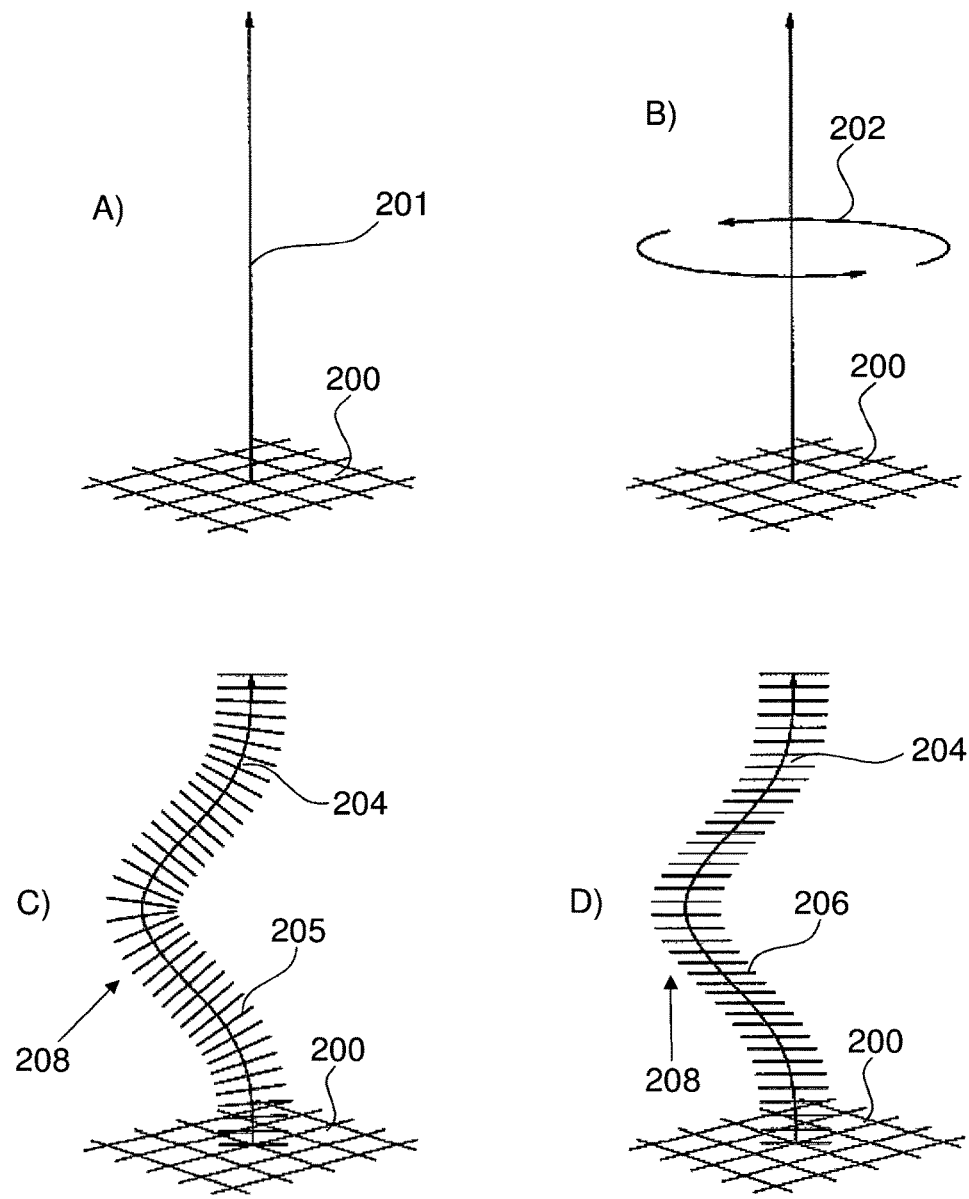
FIG. 8 shows schematic representations of different trajectories of the main longitudinal axis of a column produced with an embodiment of the slipform assembly according to one of FIG. 1, 2, 4 or 6.

The apparatus 10 comprises a robot 20 having at least two arms 21 and 22 for a free movement of its upper free end in space, especially having six degrees of freedom for the element attached to it, wherein the arms 21 and 22 are connected with the base of the robot 20 and such the ground via joints. The ground is also the fixed base for the frame and scaffold. Ground or base 200 is shown in FIG. 8. In other words. If the robot 20 is only used to maintain the formwork frame 30 in place, then the actuators 40 displace the mould walls or part of them achieving inter alia the results of FIG. 5. If the actuators are not activated but remain in a predetermined position or a missing in a simpler embodiment, then the movement of the formwork frame 30 by the robot displaces the mould walls as such and in their entirety. In such a case the "actuators" are the drives of robot 20 with its robot arms 21 and 22.

Figure 2:
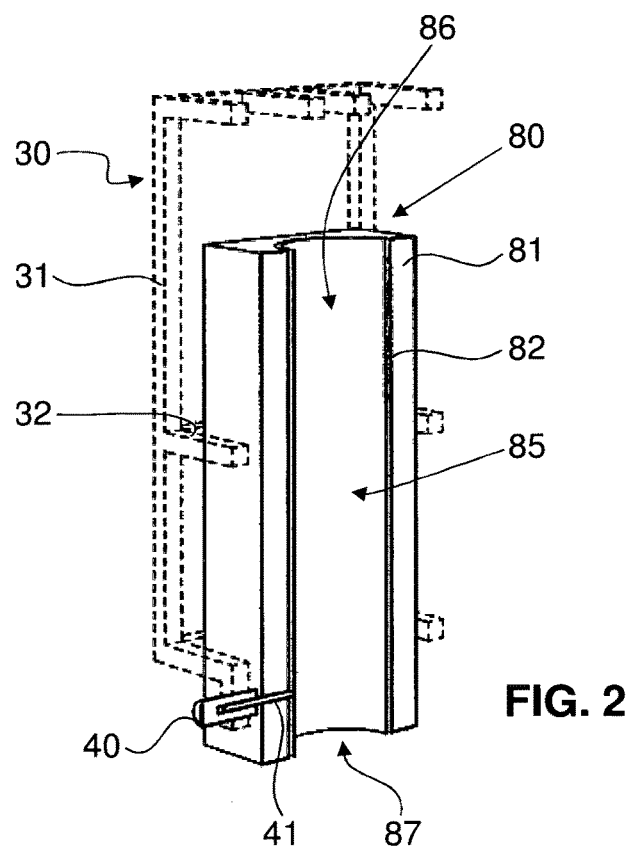
FIG. 2 shows a schematic drawing of an embodiment of slipform and framework according to the invention.

There is provided an attachment portion 23 at that free end, which can be displaced with the robot in the three directions X, Y and Z according to the reach of the arms 21 and 22 and allow the rotation and tilting of the attachment portion 23. A formwork frame 30 is attached to the attachment portion 23. Since the formwork frame 30 can be any conventional formwork frame and is considered to be a generic form, it is shown in broken lines in FIGS. 2, 4 and 6. The formwork frame 30 is shown having vertically oriented profiles 31 and horizontally oriented profiles 32. In fact, it is only necessary that the formwork frame 30 comprises elements which comprise a mould as shown in FIG. 2, 4 6 or other embodiments. In fact, the formwork frame can be integrated into the mould elements. FIG. 1 does not show the mould but only the concrete column 55 inside the frame 30 (and the mould) and especially the portions A, B and C as will be explained below.

The attachment portion 23 can be adapted to rotate the frame (and mould) according to arrows 73 and the robot arms 21 and 22 are adapted to displace the frame 30 in the vertical direction as well as perpendicular to that vertical direction, which is represented with arrow 72. It is also possible to exert a tilting movement on the mould/formwork frame, which has not received a specific movement arrow in FIG. 1.

Finally, FIG. 1 shows sensors 40 at the lower frame portions oriented towards the concrete column 55 and adapted to sense material properties of the cast concrete. These measurements can thus be executed—in this particular embodiment—in line with the casting process in real time to provide a feedback loop. This can also be done with sensors integrated in the form giving actuators for additional in line measurements or sensors can be provided additionally or instead for offline measurements as explained in this specification.

The cementitous basis material 50 is prepared to be introduced in a supply means for the mould which is shown as a funnel 45. The generic element funnel 45 also stands for any pipe arrangement and especially I is noted that a pump can be used as well. Material 50 is prepared through adding chemical triggers 51 in a variable but predetermined dosage in one or more batches 52, 53 and 54. It is possible to use a control unit 70 to control the addition of the triggers 51 to the batches. Variations on the trigger dosages may be made depending on results of the property evolution of the batch concrete. The batch concrete may itself be modified, for example by increasing the content of retarding agent if the overall process needs more time than planned.

Beside the use of inline sensors 40 which are also connected to the control unit 70 for delivering signals relating to the sensed material properties relating to the stiffening and hardening rate, it is also possible to use portions of the batches A, B and C to be checked offline with offline sensors 60 separate from the form and previously to adding the material to the funnel 45. Then the hardening procedure can be checked offline without interfering with the casting process inside the mould. Of course, it is also possible to transmit the results of the sensor output to the control unit.

Batches A, B and C are introduced one after the other (or one batch continuously) into the apparatus and the control unit 70 generates and transmits control signals to the robot 20 for an incremental vertical movement 72 which can be accompanied at the same time by a movement in the horizontal direction, thus giving the path and trajectory of arrow 72. This however will not produce the column 55 as shown in FIG. 1 since this relates to further features as explained in FIG. 8. Within this embodiment three batches are mentioned. It is also possible to use a higher number of batches.

It is possible to include periodically some "grips" for the cast of more complex shapes. These grips will take up the shear forces from the lateral displacements. They would avoid displacement of the whole column in reaction to those lateral displacements. They would also stabilise columns if their centre of gravity extends beyond the base surface. This will become even more beneficial when higher columns are cast and larger lateral displacements are planned.

FIG. 2 shows a schematic drawing of an embodiment of a slipform 80 and framework 30 according to the invention, which can be used in connection with the robot 20 and control unit 70 of FIG. 1. FIG. 3A to 3F show different basic formwork geometries as a section view at the bottom level 87 of the slipform, which can then produce non-round columns, wherein a further different result is shown as column 55 in FIG. 1.

As mentioned in connection with FIG. 1 a slipform assembly is connected with the attachment means 23 through formwork frame 30. Formwork frame 30 is shown in broken lines in FIG. 2, since this drawing relates to a schematic view of the slipform assembly 80. Slipform assembly 80 comprises an extrusion form with an inner cavity 85 defined by side walls 81. The cylindrical side walls 81 define a longitudinal cavity 85 along the main axis of the assembly, which is usually oriented vertical to ground 200 as line 201 in FIG. 8A or curved as line 204 in FIGS. 8C and 8D.

The hollow cylinder has a circular top open surface 86 and a circular bottom open surface at bottom level 87. The inner wall of the mould is coated by a lubricant foil 82. It is also possible, instead or additional, to provide a lubricant material to be injected or introduced at the interface between the inner wall of the mould and the introduced concrete material. At least one sensor 40 is provided which extends with the sensor channel 41 through the mould side wall 81 to analyse different physical or chemical properties of the concrete gliding through the cavity 85.

FIG. 3A shows a round cross section which can be moved together with formwork frame 30 to allow production of a column 55 after a movement as shown with arrow 72. FIG. 3B shows an elliptical cross section of the mould walls 81. This embodiment could be displaced as the round column shown in FIG. 3A but can also simply be rotated as shown in FIG. 1 with a rotation of the attachment means 23 rotating the formwork frame 30 with the connected mould 80 along arrow 73. Then a column similar to column 55 shown in FIG. 1 will be produced.

FIG. 3C to F show different cross sections as a triangle, a square, a rectangle and a three pronged star as different basic formwork geometries in a section view at the bottom level 87. It is to be noted that these drawings are exemplary and explanatory and that for someone skilled in the art possible variations of geometries/formwork cross sections can be made according to the invention. It could also be the case that the cross-sections are hollow, this would mean that they are tubular and could be seen as a system for cores or facades of buildings if the apparatus would be attached to a larger scaffolding structure. In such a case an interior cylinder would be attached to the attachment means and thus moved together with the mould or formwork frame 30 to provide an annular cavity for the concrete material.

FIG. 4 shows a schematic drawing of a further embodiment of slipform and framework according to the invention with actuators 140, 141. FIG. 5A to 5E show schematic views of different embodiments of flexible formwork geometries as a section view at the plane of the actuators through the slipform according to FIG. 4;

Similar features receive similar or identical reference numerals throughout the specification. FIG. 4 shows slipform mould 80 with wall 81 with a combined sensor/actuator unit 140 at the lower end of the mould 80, e.g. sufficiently separated from the free end to allow the foil 82 to be attached at the lower edge circumference 89.

Foil 82 can be a flexible lubricant membrane as made from Teflon®, polyethylene, polypropylene or silicon. Wall 81 can be in steel, blank sheet plate, hard foam or aluminum, PVC, pipe etc.

In the representation of FIG. 4 four actuators 140 are provided which gives as a schematic cross section view the representation of FIG. 5D with arrows 240 showing the direction of the displacement of the foil 82 from the wall 81.

Actuators 140 (and schematically shown as 240) are adapted to adjust the position of the side walls forms 82 essentially arranged along the longitudinal axis of the slipform assembly in their relationship to the side walls 81 during the incremental vertical movement 72 of the slipform assembly 80 to provide a changing cross section.

Here, the side walls 81 of the slipform assembly 80 are cylindrical in the mathematical sense and the actuators 140, 240 are adapted to change the circumference of the side walls and especially near the bottom open surface at bottom level 87, especially parallel in time to the incremental vertical movement.

Therefore the feature of displacing the mould walls and to adjust their position during the vertical movement of the slipform assembly relative to the base is achieved by actuators acting on a foil 82 associated to a sidewall 81. Therefore the feature mould wall is realized by the combination of a sidewall 81 and a foil 82, wherein actuators 40 are displacing parts of this mould wall, i.e. the foil 82.

The actuators 140 comprise pistons (not shown) having a round forming ball 142 at the inner end, which ball 142 can be retracted into the wall 81, optionally completely. In the opposite movement it is pushing the foil or membrane 82 from the wall 81 and restricts the passage of the concrete in the cavity 55 to a specific predetermined extent. This can be—with four actuators 140—as shown in FIG. 5D. Two actuators 20 in opposite relationship (or moving only two out of four according to FIG. 4) provide the restriction shown in FIG. 5B. Of course, it is possible to use different geometries for the forming element 142 at the end of the piston.

FIG. 5C shows the application of three actuators 240 in a 120° relationship and FIG. 5E a star orientation of five actuators 240.

The actuators 140 or 240 are adapted to move portions of the side walls 81 independently from other portions of the side walls 81 in a perpendicular direction relating to the longitudinal direction of the extrusion process and parallel in time to the incremental vertical movement. This movement is coordinated through control signals form the control unit 70. It is also possible to provide control signals only to one or another of the actuators 140 or different control signals, so that different cross section forms can be achieved. A usual embodiment of such actuators 140 or 240 comprises pistons and are hydraulically operated.

The actuator 140 can comprise a sensor, e.g. integrated in the ball 141, to measure different parameters to sense the chemical and physical properties of the extruded concrete at the constriction level inside the cavity 85 since this is within the last centimeters of the column before leaving the mould and being forced to stand alone. Ball 141 can have a different form and can have a flat surface or a general convex or even concave geometry.

FIG. 6 shows a schematic drawing of a further embodiment of slipform and framework according to the invention with actuators 152 providing a shutter system. Here the sensors 40 are provided above the shutter system, but they can also be provided near the lower circumference 182. Here the slipform assembly 80 in the formwork frame 30 is cylindrical and comprise a tapering end which is formed of overlapping aperture closing plates to restrict the lower or bottom opening at bottom level 87 of the apparatus 80 as shown in FIGS. 7B and 7C. This assembly allows casting columns with a variable diameter as well as—together with a lateral movement of the frame—curved columns.

FIG. 7A to 7C show different embodiments of flexible formwork geometries as a section view at the plane of the shutter system according to FIG. 6. In other words, side walls 81 of the slipform assembly form a cylindrical tube with a circular bottom surface at bottom level 87 and wherein the actuators are adapted to change the diameter of the circular bottom surface at bottom level 87, especially parallel in time to the incremental vertical movement. The actuators comprise a shutter system reducing the diameter of the inner cavity 85 at the bottom surface at bottom level 87.

Here the actuators 152 are integrated in the shutter system, displacing the aperture elements, and these movable elements of the shutter system 152 are in the downward prolongation of the cylindrical side wall 81 and are as such part of the mould wall.

FIG. 8A to 8D show schematic representations of different trajectories 201, 204 of the main longitudinal axis of a column produced with an embodiment of the slipform assembly according to one of FIG. 1, 2, 4 or 6;

FIG. 8A provides the sketch of a simple vertical movement 201 against the ground 200. This can be accompanied with a changing diameter of the column as in FIG. 6 or a form change of the column as in FIG. 5B to 5E.

FIG. 8B provides the sketch of a simple rotational movement 202 of the formwork frame 30 over ground 200. This can provide a twisted column 55 as shown in FIG. 1 when a non-symmetrical form as in FIGS. 3B to 3F is rotated. The same is true for a rotation of a form when the actuators 140, 240 are in position as shown in FIG. 5B to 5E.

It is possible to superpose the movement of rotation as shown in FIG. 8B with a displacement of actuators 140, 240 so that beside a rotation also the outer circumference of the column changes upon time, when more and more of the concrete is released when the robot 20 is moving the formwork frame 30 upwards. It is noted that the robot 20 stands on the ground or on a fix scaffold, which can be named frame against which the formwork frame 30 being or enclosing the mould 80 is moved in relation to.

FIG. 8C and FIG. 8D show a further movement, i.e. the offset movement 208 of the column. This can be achieved with any slipform according to FIG. 2, 4 or 6 and can be superposed by a circumference change according to FIG. 6 or a form change according to FIG. 4 or simply following it with a fix form according to FIG. 2.

Figure 3:
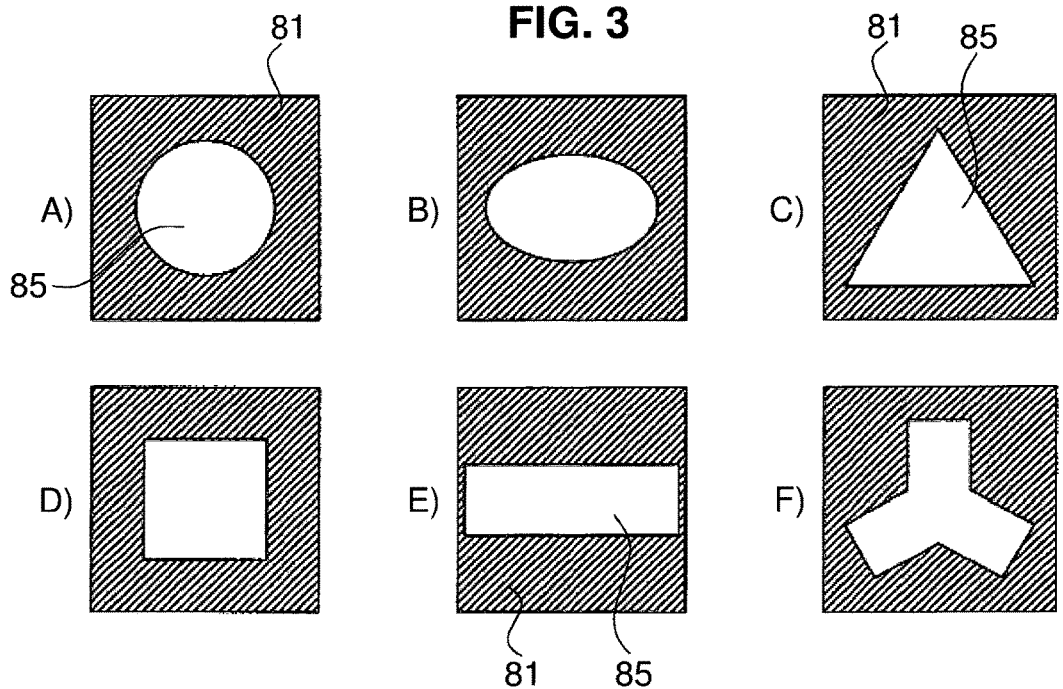
FIG. 3A to 3F show different basic formwork geometries as section view at the bottom of the slipform.

The procedure with a vertical attachment portion 23 is shown in FIG. 3, where the actuators 140/240 or the shutter system 152 with its lower opening edge 182 is in a horizontal plane. Then—in every moment in time—the released concrete layers are parallel one to another over time as shown with plane 206. FIG. 8C shows the case where the formwork would work its way up in such way that the formwork is parallel or 90° to the trajectory curve (central curve 204). FIG. 8D shows the case, where the formwork would work its way up in such way that the bottom of the formwork is parallel to the base/ground.

The other possibility is to incline formwork frame 30, so that in every time of the concrete cast process the plane 205 is still perpendicular to the main longitudinal axis 204 but is no longer parallel to ground level 200. This allows an easier introduction of reinforcement structures or to provide an inner cylinder to cast a hollow column.

In other words, FIG. 8 shows an embodiment where the actuators are adapted to displace the bottom open surface of the slipform assembly 80 laterally offset 208 from the initial position of said bottom open surface of the slipform 80 during the incremental vertical movement, either in parallel to ground (no inclination of formwork frame 30) or inclined following the main extrusion axis 204.

A control unit 70 is only shown in FIG. 1; however as explained throughout the specification the control unit is provided to be connected to the robot 20, if present, and the actuators 140, 240 and 152 and is adapted to generate and transmit control signals to the actuators of robot 20 causing the vertical incremental movement and to generate and transmit control signals to the actuators 140; 240; 152 causing the adjustment of the position of the mould walls comprising following the different embodiments static side walls 81, side walls 81 having a prolongation of a shutter system 152 with a lower tapered shutter wall 181 or sidewalls 81 comprising a displaceable foil 82 during the vertical incremental movement.

The control unit 70 is further connected to inline and/or offline sensors 40 and 60 and is adapted to influence the control signals causing the vertical incremental movement and/or the adjustment of the position of the mould walls incorporating the side walls 81 or side walls with a shutter-system 152 with a lower tapered shutter wall 181 in function of the hardening of the concrete column leaving the apparatus at its bottom opening at bottom level 87.

Figure 9:
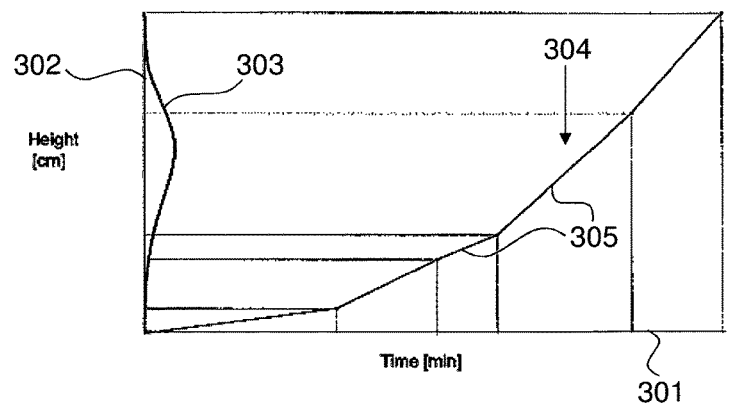
FIG. 9 shows a representation of the height of a column produced according to an embodiment of the invention against the time used for its production, the first part of the production being very slow, since the cementitious material need to obtain strength and due to the strength development over time, the slipforming velocity is increased.

FIG. 9 shows a representation of the height of a column produced according to an embodiment of the invention against the time used for its production. The figure shows that the first part of the production is slow, since the cementitious material needs to obtain strength. Because of the strength development over time, the slipforming velocity is increased accordingly. Curve 303 refers to the trajectory performed by the device, in the present case the robot; the curve shows the deviation over time. Y-axis 302 is the trajectory of the curve; X-axis 301 is the velocity. The curve 303 on the Y-axis 302 is an example of a curved trajectory performed by the robot and such is an image of a line along one longitudinal portion of the outer surface of the column.

The slip velocity is set in accordance to the curvature and to the stiffening of the concrete. Curve 304 shows the speed acceleration over time. Generally the curve is showing an accelerating speed, however discontinuous since it is set in accordance to the stiffening/loadbearing capacity of the material and to the formability. At the start the speed curve 304 is flat, meaning slow. The material is very delicate at this point, therefore the initial slipping must be slow, reflected through the small gradient of the first segment 305. As strength is increasing by the chemical reaction of the material the slip velocity accelerates in the second segment 305. As the curvature starts (as the example shown) at about ⅓ of the height of the column, the velocity acceleration is flat to allow for a controlled formability. When no curvature, i.e. at the end of column, is intended, the velocity can accelerate as is the case in the example shown. The start of curvature and the curvature can be of course variable, and this graph should only be shown as an example. That velocity must be adjusted in accordance to material properties and formability. The height of the column or member or structure does not have a pre-defined end. The height is constrained by the construction environment.

The curve is the geometrical definition of the movement done by the robot. The curve (in the Y-Axis 302 is defined in a CAD program then exported into an appropriate machine language, known as G-code in the art. The curve shown in FIG. 9 is an example of a possible curvature and trajectory to be performed.

Figure 10:
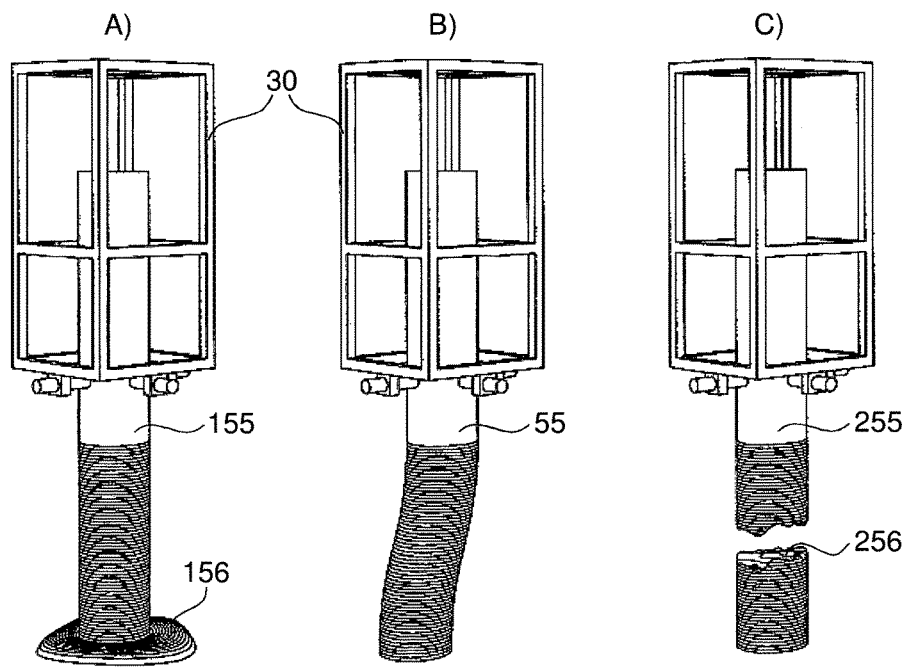
FIG. 10 shows the influence of correct and erroneous choice of slipforming velocity for a concrete column produced with a slipform according to an embodiment of the invention.

FIG. 10 finally shows the influence of correct and erroneous choice of slipforming velocity for a concrete column produced with a slipform according to an embodiment of the invention. FIG. 10B shows a lateral offset movement of the column over the extraction cycle at the correct speed. FIG. 10A shows a movement of the formwork frame 30 which is too fast with respect to the setting and hardening rate of the released concrete. This results in the released concrete not being able to sustain the material above it and expanding laterally 156 at the bottom level of base 200. FIG. 10C shows the opposite result, when the displacement of formwork frame 30 compared to the setting and hardening process so that the hardening concrete is pulled together with the frame and forms cracks and in the end a fissured concrete column 55.

The present specification also explains the novel method of vertical 72 slipforming of concrete walls 55 with a slipform apparatus 10 according to the specification, wherein the method comprises the steps of providing the slipform apparatus 10 at the place of the concrete form to be cast; providing one or more batches A, B, C of concrete with one or more predetermined hardening characteristics; delivering the one or more batches of concrete to the supply means 45 of the apparatus 10; generating and transmitting control signals to the means 20 for vertically displacing 72 the slipform assembly 80 for the incremental vertical movement as well as to the actuators 140, 240, or 20 or 152, respectively, to adjust the position of the side walls 81 and 181 during the incremental vertical movement 72 of the slipform assembly 80. This adjustment of position can be sideways, include a rotation around the longitudinal axis of the column and comprise an inclination of the axis of the column 55. Furthermore the adjustment of position of the actuators can influence the outer form of the column 55, e.g. the diameter—which is used here in the synonym meaning that the volume of concrete passing through a specific bottom level 87 circumference of the opening edge 182 is changing. This can comprise a simple diameter change as with a shutter system according to FIGS. 6 and 7 or a form and diameter change as with actuators according to FIGS. 4 and 5. In any case the different displacements, rotations and inclinations can be combined, especially through an adapted control program provided in the memory of preferably programmable control unit 70.

If the extruded material is in a cylindrical shape, then the column 55 formed will have a different diameter over the height. The feature relating thereto can be that the actuators are moving towards the centre of the cast cavity in order to influence the diameter of the cylindrical column. The movement of these elements can also be asymmetrical, so that different forms can be extruded, which can be e.g. an elliptic or star form. Of course, this can also comprise longitudinal walls with different thickness, i.e. the actuators could be applied for a prior art wall device as shown in U.S. Pat. No. 5,198,235, which is then displaced (=moved offset) over height.

| LIST OF REFERENCE SIGNS | |
|---|---|
| 10 | apparatus |
| 20 | robot |
| 21 | robot arm |
| 22 | robot arm |
| 23 | robot attachment |
| 30 | formwork frame |
| 31 | vertical frame profile |
| 32 | horizontal frame profile |
| 40 | material property sensor |
| 41 | sensor channel |
| 45 | supply means/funnel |
| 50 | cemetitious material reservoir |
| 51 | chemical trigger additive |
| 52 | first batch |
| 53 | second batch |
| 54 | third batch |
| 55 | resulting concrete structure |
| 60 | offline sensor measurement |
| 70 | control processor |
| 72 | translational movement |
| 73 | rotational movement |
| 80 | slipform assembly |
| 81 | side wall |
| 82 | lubricant foil |
| 83 | space |
| 85 | inner cavity |
| 86 | top opening |
| 87 | bottom level |
| 89 | lower edge circumference |
| 140 | actuator with sensor |
| 141 | forming ball |
| 142 | force sensor |
| 152 | shutter plate |
| 155 | too fast slipformed column |

-continued

| LIST OF REFERENCE SIGNS | |
|---|---|
| 156 | creep bottom |
| 181 | tapered shutter wall |
| 182 | shutter wall circumference |
| 200 | base |
| 201 | straight slipforming |
| 202 | slipforming with rotation of column |
| 204 | middle axis of offset |
| 205 | perpendicular-to-trajectory slipforming plane |
| 206 | parallel-to-base slipforming plane |
| 208 | lateral offset |
| 240 | schematic actuator |
| 255 | too slow slipformed column |
| 256 | broken or cracked column |
| 301 | time axis |
| 302 | height axis |
| 303 | displacement of the actuator |
| 304 | height of the column |
| 305 | different discontinuous sections |

The invention claimed is:

1. An apparatus for vertical slip forming of concrete structure on a base comprising:
   an attachment portion for a frame;
   a slipform assembly having a top open surface and a bottom open surface and being connected with the frame;
   concrete supply unit connected with the slipform assembly for delivering concrete to the slipform assembly through its top open surface as a gravity load;
   a displacing unit for vertically displacing that slipform assembly incrementally relative to the base thereby to continuously or incrementally cast a concrete structure having a vertical orientation; and
   a control unit,
   wherein the slipform assembly comprises an extrusion form providing mould walls defining a cavity between the top open surface and the bottom open surface and actuators adapted to adjust the position of the mould walls essentially arranged along the longitudinal axis of the slipform assembly,
   wherein the actuators are configured to adjust the position of the mould walls during the incremental vertical movement of the slipform assembly relative to the base,
   wherein the control unit is connected to the actuators and adapted to generate and transmit control signals to the actuators causing the vertical incremental movement and to generate and transmit control signals to the actuators causing the adjustment of the position of the mould walls during the vertical incremental movement,
   wherein the control unit is adapted to influence the control signals causing the vertical incremental movement and/or the adjustment of the position of the mould walls in function of the hardening of the concrete column leaving the apparatus at its bottom opening,
   wherein the side walls of the slipform assembly form a cylindrical tube with a circular bottom surface and
   wherein the actuators are adapted to change the diameter of the circular bottom surface.

2. The apparatus according to claim 1, wherein the actuators are adapted to change said diameter parallel in time to the incremental vertical movement.

3. The apparatus according to claim 1, wherein the actuators comprise a shutter system reducing the diameter of the inner cavity at the bottom surface.

4. An apparatus for vertical slip forming of concrete structure on a base comprising:
   an attachment portion for a frame;
   a slipform assembly having a top open surface and a bottom open surface and being connected with the frame;
   concrete supply unit connected with the slipform assembly for delivering concrete to the slipform assembly through its top open surface; and
   a displacing unit for vertically displacing that slipform assembly incrementally relative to the base thereby to continuously or incrementally cast a concrete structure having a vertical orientation,
   wherein the slipform assembly comprises an extrusion form providing mould walls defining a cavity between the top open surface and the bottom open surface and actuators adapted to adjust the position of the mould walls essentially arranged along the longitudinal axis of the slipform assembly,
   wherein the actuators are configured to adjust the position of the mould walls during the incremental vertical movement of the slipform assembly relative to the base,
   wherein the actuators are adapted to move portions of the mould walls independently from other portions of the mould walls in a perpendicular direction relating to the longitudinal direction of the extrusion process in parallel to the incremental vertical movement,
   wherein the mould walls comprise a side wall having an inner surface and provided with a foil, and
   wherein the actuators are adapted to displace the foil from the inner wall of the slipform mould to reduce the diameter of the inner cavity near the bottom surface.

5. The apparatus according to claim 4, wherein the actuators comprise a shutter system reducing the diameter of the inner cavity at the bottom surface.

6. The apparatus according to claim 1, wherein the actuators are adapted to displace the open surface at the bottom level of the slipform assembly laterally offset from the initial position of said open surface at the bottom level of the slipform during the incremental vertical movement.

7. The apparatus according to claim 1, wherein the actuators are adapted to rotate the slipform assembly relating to the longitudinal direction of the extrusion process parallel in time to the incremental vertical movement.

8. The apparatus according to claim 1, wherein the actuators are adapted to tilt the slipform assembly relating to the longitudinal direction of the extrusion process parallel in time to the incremental vertical movement.

9. A method of vertical slip forming of concrete walls with a slipform apparatus comprising:
   an attachment portion for a frame;
   a slipform assembly having a top open surface and a bottom open surface and being connected with the frame;
   concrete supply unit connected with the slipform assembly for delivering concrete to the slipform assembly through its top open surface; and
   a displacing unit for vertically displacing that slipform assembly incrementally relative to the base thereby to continuously or incrementally cast a concrete structure having a vertical orientation,
   wherein the slipform assembly comprises an extrusion form providing mould walls defining a cavity between the top open surface and the bottom open surface and actuators adapted to adjust the position of the mould walls essentially arranged along the longitudinal axis of the slipform assembly, wherein the mould walls comprise a side wall having an inner surface and provided with a foil, and wherein the actuators are adapted to displace the foil from the inner wall of the slipform mould to reduce the diameter of the inner cavity near the bottom surface, the method comprising the steps of providing the slipform apparatus at the place of the concrete form to be cast;

providing one or more batches of concrete with a predetermined hardening characteristic;

delivering the one or more batches of concrete to the supply unit of the apparatus; and generating and transmitting control signals to the displacing unit for vertically displacing the slipform assembly for the incremental vertical movement as well as to the actuators to adjust the position of the side walls through displacing the foil from the inner wall of the slipform mould during the incremental vertical movement of the slipform assembly.

10. The method according to claim 9, wherein additional control signals are generated and transmitted to the actuators, which are adapted to rotate and/or tilt the slipform assembly relating to the longitudinal direction of the extrusion process parallel in time to the incremental vertical movement.

* * * * *